(12) United States Patent
Yamaura

(10) Patent No.: US 6,189,086 B1
(45) Date of Patent: *Feb. 13, 2001

(54) DATA PROCESSING APPARATUS

(75) Inventor: Shinichi Yamaura, Hyogo (JP)

(73) Assignee: Ricoh Company Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/906,682

(22) Filed: Aug. 5, 1997

(30) Foreign Application Priority Data

Aug. 7, 1996 (JP) .................................... 8-208513

(51) Int. Cl.$^7$ ...................................................... G06F 9/34
(52) U.S. Cl. ........................ 712/205; 711/214; 711/215; 711/219; 711/220
(58) Field of Search ............................ 395/394; 711/213, 711/214, 215, 219, 132; 712/218, 205, 220, 230, 211, 221, 223

(56) References Cited

U.S. PATENT DOCUMENTS

| 4,133,028 | * | 1/1979 | Bernstein | ............................ 395/284 |
|---|---|---|---|---|
| 4,538,223 | * | 8/1985 | Vahlstrom et al. | ................... 711/214 |
| 5,357,620 | * | 10/1994 | Suzuki | ................... 711/220 |
| 5,794,063 | * | 8/1999 | Favor | ..................... 712/23 |
| 5,838,940 | * | 11/1998 | Savkar et al. | ......................... 712/216 |
| 5,860,154 | * | 1/1999 | Abramson et al. | ................... 711/220 |
| 5,872,965 | * | 2/1999 | Petrick | ................... 712/236 |
| 5,923,871 | * | 7/1999 | Gorshtein et al. | ................... 712/221 |

FOREIGN PATENT DOCUMENTS

| 56-164447 | 12/1981 | (JP) | ................. G06F/9/36 |
|---|---|---|---|
| 60-138641 | 7/1985 | (JP) | ................. G06F/9/36 |
| 6-355637 | 3/1988 | (JP) | ................. G06F/9/36 |
| 5-150979 | 6/1993 | (JP) | ................. G06F/9/30 |
| 58-137047 | 8/1993 | (JP) | ................. G06F/9/30 |

* cited by examiner

Primary Examiner—William M. Treat
(74) Attorney, Agent, or Firm—Cooper & Dunham LLP

(57) ABSTRACT

A microprocessor apparatus executes a program including an instruction which indicates an address for taking out an operand from a main memory in a predetermined addressing mode which belongs to a displacement-adding register indirect addressing mode. The microprocessor includes address generating portion for shifting by a predetermined number of bits the value of a displacement which is indicated by the instruction, adding the thus-shifted value to the value stored in a predetermined register and thus generating an effective address, when the operand of the instruction is taken out from the main memory.

16 Claims, 5 Drawing Sheets

FIG.9A

| EA | | SYMBOL | DESCRIPTION |
|---|---|---|---|
| 0 0 0 | D | -[D] | PRE-DECREMENT · REGISTER INDIRECT |
| 0 0 1 | D | [D, $] | DISPLACEMENT-ADDING REGISTER INDIRECT |
| 0 1 0 | D | [D, $$] | DISPLACEMENT-ADDING REGISTER INDIRECT |
| 0 1 1 | D | [D, $$$] | DISPLACEMENT-ADDING REGISTER INDIRECT |
| 1 0 0 | D | [D]+ | POST-INCREMENT · REGISTER INDIRECT |
| 1 0 1 | D | [D] | REGISTER INDIRECT |
| 1 1 0 | RG | RG | REGISTER |

FIG.9B

| EA | | SYMBOL | DESCRIPTION |
|---|---|---|---|
| 1 1 1 | 0 0 0 | ! | HIGH-SPEED DIRECT |
| 1 1 1 | 0 0 1 | $ | SHORT DIRECT |
| 1 1 1 | 0 1 0 | $$ | DIRECT |
| 1 1 1 | 0 1 1 | $$$ | LONG DIRECT |
| 1 1 1 | 1 0 0 | #8 | IMMEDIATE(8→8,16,32 EXTENSION) |
| 1 1 1 | 1 0 1 | # | IMMEDIATE |

FIG.9C

| EA | | SYMBOL | DESCRIPTION |
|---|---|---|---|
| 0 0 0 | 1 1 0 | -[SP] | PRE-DECREMENT SP INDIRECT |
| 0 0 1 | 1 1 0 | [SP, $] | DISPLACEMENT-ADDING SP INDIRECT |
| 0 1 0 | 1 1 0 | [SP, $$] | DISPLACEMENT-ADDING SP INDIRECT |
| 0 1 1 | 1 1 0 | [SP, $$$] | DISPLACEMENT-ADDING SP INDIRECT |
| 1 0 0 | 1 1 0 | [SP]+ | POST-INCREMENT SP INDIRECT |
| 1 0 1 | 1 1 0 | [FP, $] | DISPLACEMENT- ADDING FP INDIRECT |
| 1 1 0 | 1 1 0 | [FP, $$] | DISPLACEMENT- ADDING FP INDIRECT |
| 1 1 1 | 1 1 0 | [FP, $$$] | DISPLACEMENT- ADDING FP INDIRECT |

FIG.9D

| EA | | SYMBOL | DESCRIPTION |
|---|---|---|---|
| 0 0 0 | 1 1 1 | [!] | |
| 0 0 1 | 1 1 1 | [$$] | |
| 0 1 0 | 1 1 1 | [PC, $$] | |
| 0 1 1 | 1 1 1 | [$$$, w2] | OTHER ADDRESSING MODES |
| 1 0 0 | 1 1 1 | [$$$, w3] | |
| 1 0 1 | 1 1 1 | [RG, R*S] | |
| 1 1 0 | 1 1 1 | [RG, W*S] | |
| 1 1 1 | 1 1 1 | [RG, D*S] | |

DATA PROCESSING APPARATUS

BACKGROUND OF THE INVENTION

1. Field of the Invention

The present invention relates to a data processing apparatus which processes data as a result of executing a program including predetermined instructions, for example, to a CPU such as a microprocessor and a computer using a CPU.

2. Description of the Related Art

In a data processing apparatus such as a microprocessor, instructions of a program are executed one by one. Thus, data processing is performed. At this time, data on which an operation indicated by an instruction to be executed is to be performed is taken from a main memory as an operand. Ordinarily, an address is allocated in the main memory for each byte. When an operand is taken out, the address indicates the position of the main memory at which the operand is stored. For a microprocessor or the like, several addressing modes are prepared as address indicating methods. For example, in an absolute addressing mode an address is directly indicated by code data included in an instruction. In a displacement-adding register indirect addressing mode, an address is obtained as a result of a displacement being added to a value stored in a predetermined register. The displacement is indicated by an instruction. Each instruction included in a program for data processing includes data (hereinafter, referred to as 'addressing data') which indicates the address of an operand of the instruction.

The size of a program used for performing data processing in a microprocessor or the like is a large factor to determine evaluation of the microprocessor or the like. It is preferable that the size of a program required for a desired data processing is shorter. For this purpose, it is demanded to reduce the size of the above-mentioned addressing data included in each instruction of a program. However, by simply reducing the size of the addressing data, a range of addresses which can be indicated is reduced. Thereby, data which can be processed is limited, and flexibility of programing is degraded.

SUMMARY OF THE INVENTION

An object of the present invention is to provide a data processing apparatus such as a microprocessor or the like in which, without reducing a range of addresses which can be indicated, a program size can be reduced.

A first data processing apparatus according to the present invention executes a program including an instruction which indicates an address for taking out an operand from a main memory in a predetermined addressing mode which belongs to a displacement-adding register indirect addressing mode. The first data processing apparatus comprises:

address generating means for shifting by a predetermined number of bits the value of the displacement which is indicated by the instruction, adding the thus-shifted value to the value stored in a predetermined register and thus generating an effective address, when the operand of the instruction is taken out from the main memory.

A second data processing apparatus is the data processing apparatus according to the first data processing apparatus. In the second data processing apparatus, the address generating means treats the value of the displacement as a positive integer without sign and performs the shifting and the adding.

A third data processing apparatus is the data processing apparatus according to the first data processing apparatus. In the third data processing apparatus, the address generating means treats the value of the displacement as a negative integer without sign and performs the shifting and the adding.

A fourth data processing apparatus is the data processing apparatus according to the first data processing apparatus. In the fourth data processing apparatus, the address generating means adds the shifted value of the displacement to the value stored in a register which is previously fixed for the addressing mode of the instruction and thus generates the effective address.

A fifth data processing apparatus is the data processing apparatus according to the third data processing apparatus. The fifth data processing apparatus further comprises an FP register which stores the value of a frame pointer. In the fifth data processing apparatus, the address generating means treats the value of the displacement indicated by the instruction as an integer without sign, shifts the value one bit leftwardly, causes the resulting value to be a negative integer by adding '1' as the sign bit to the value as the most significant bit, adds the negative integer to the value stored in the FP register and thus generates the effective address.

A sixth data processing apparatus is the data processing apparatus according to the fourth data processing apparatus. In the sixth data processing apparatus:

the instruction includes a 2-bit field for indicating any of three sizes as the size of the operand of the instruction; and the address generating means adds the shifted value of the displacement to the value stored in the register which is previously fixed for the addressing mode of the instruction and thus generates the effective address, when a value of the four values which can be expressed by the 2 bits, the value not being used for indicating the size of the operand, is set in the 2-bit field.

A seventh data processing apparatus according to the present invention executes a program including an instruction which indicates an address for taking out an operand from a main memory in a predetermined addressing mode which belongs to an absolute addressing mode. The seventh data processing apparatus comprises:

address generating means for shifting by a predetermined number of bits the value of the address which is indicated by the instruction, the thus-shifted value being used as an effective address, when the operand of the instruction is taken out from the main memory.

In the first data processing apparatus according to the present invention, in the displacement-adding register indirect addressing mode, when the value of each displacement is a multiple of 2 or a multiple of 4 because data of operands is arranged from addresses of multiples of 2 or addresses of multiples of 4, an addressing mode is used in which the data obtained from removing the less significant 1 bit or 2 bits from the displacement is used as the displacement, and the effective address can be generated as a result of the value of the displacement being shifted leftwardly 1 bit or 2 bits. Accordingly, in the above-described case of the displacement-adding register indirect addressing mode, it is possible to reduce the length of the instruction. Generally speaking, the size of each operand is an integer times the length of the basic word of the data processing apparatus, and, in many cases, data of operands is arranged from addresses of multiples of 2 or multiples of 4. Accordingly, by using this data processing apparatus, it is possible to reduce the size of a program to be executed.

In the second data processing apparatus according to the present invention, in the displacement-adding register indirect addressing, when the displacement is a positive integer, it is possible to use an addressing mode in which the integer without sign is used as the displacement, and the effective address can be obtained as a result of the integer without sign being shifted the predetermined number of bits and the resulting value being added to the value of the predetermined register. Accordingly, in the above-described case of the displacement-adding register indirect addressing mode, it is possible to further reduce the length of the instruction. Thereby, by using the second data processing apparatus, it is possible to further reduce the size of a program to be executed.

In the third data processing apparatus according to the present invention, in the displacement-adding register indirect addressing, when the displacement is a negative integer, it is possible to use an addressing mode in which the integer without sign is used as the displacement, and the effective address can be obtained as a result of the integer without sign being shifted the predetermined number of bits and the resulting value being subtracted from the value of the predetermined register. Accordingly, in the above-described case of the displacement-adding register indirect addressing mode, it is possible to further reduce the length of the instruction. Thereby, by using the third data processing apparatus, it is possible to further reduce the size of a program to be executed.

In the fourth data processing apparatus according to the present invention, in the predetermined addressing mode belonging to the displacement-adding register indirect addressing mode, a register to be used as the base register is previously fixed. Accordingly, each instruction in this addressing mode does not need to have data indicating the base register. Thereby, it is possible to reduce the length of each instruction. Thereby, the size of a program to be executed can be further reduced.

In the fifth data processing apparatus according to the present invention, in the displacement-adding register indirect addressing, when the displacement is a negative even number, it is possible to use an addressing mode in which the integer without sign is used as the displacement, and the FP register is used as the base register. As a result, in this addressing mode, the displacement of each instruction can be reduced and data indicating the base register is not needed. Thereby, the size of a program such as a program produced by using a high-level language such as 'C', 'FORTRAN' or the like, which program frequently uses an addressing in which a negative even number is used as the displacement and the FP register is used as the base register, can be reduced.

In the sixth data processing apparatus according to the present invention, determination as to whether or not the value resulting from removing 1 bit or 2 bits from the displacement is used as the displacement and a previously fixed register is used as the base register is made using the value set in the field for indicating the size of the operand in the instruction. By this determining method, in addition to the addressing mode in the related art, it is possible to realize the above-mentioned addressing mode in which the length of each instruction can be reduced.

In the seventh data processing apparatus according to the present invention, when data of operands is arranged from addresses of multiples of 2 or addresses of multiples of 4, an addressing mode is used in which the data obtained from removing the less significant 1 bit or 2 bits from the address is used as the addressing data, and the effective address car be generated as a result of the value of the addressing data being shifted leftwardly 1 bit or 2 bits. Accordingly, in the above-described case of the absolute addressing mode, it is possible to reduce the length of the instruction. Accordingly, similar to the case of using the first data processing apparatus, by using the second data processing apparatus, it is possible to reduce the size of a program to be executed.

Other objects and further features of the present invention will become more apparent from the following detailed description when read in conjunction with the accompanying drawings.

BRIEF DESCRIPTION OF THE DRAWINGS

FIGS. 9A, 9B, 9C and 9D show related-art modes of the addressing modes which can be used in the microprocessor in the embodiment of the present invention;

DETAILED DESCRIPTION OF THE PREFERRED EMBODIMENT

A basic concept of addressing in a microprocessor, described later, in an embodiment of the present invention will now be described.

When executing an instruction, the microprocessor takes an operand out from a main memory. At this time, it is necessary to indicate the address which indicates the position of the operand in the main memory. In each instruction, data (addressing data) which indicates the address of an operand is included.

For the microprocessor, as address indicating methods, a plurality of addressing modes are previously provided, such as the absolute addressing mode, displacement-adding register indirect addressing mode and so forth. When producing a program, the address of an operand of each instruction is indicated in any of the addressing modes.

Figure 1:
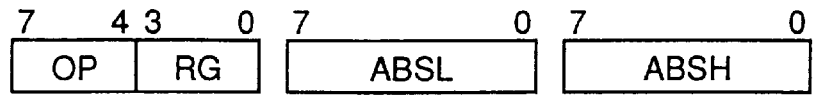
FIG. 1 shows an example of an arrangement of a general instruction code using an absolute addressing mode used in a microprocessor in the related art.

FIG. 1 indicates an arrangement of a general instruction code of the microprocessor when the absolute addressing mode is used. This instruction code includes 3 bytes and processes two operands (first operand and second operand). In the three bytes of instruction code, the more significant 4 bits, from the 7th bit to the 4th bit, of the first byte is used as a field of an operation code OP indicating operation contents of the instruction. The less significant 4 bits, from the 3rd bit to the 0th bit, of the first byte is used as a field indicating a register in which the first operand, which is processed, is stored. The data of the second byte of this instruction code is the less significant byte data ABSL of the absolute address of the second operand. The data of the third byte of this instruction code is the more significant byte data ABSH of the absolute address of the second operand.

Figure 2:
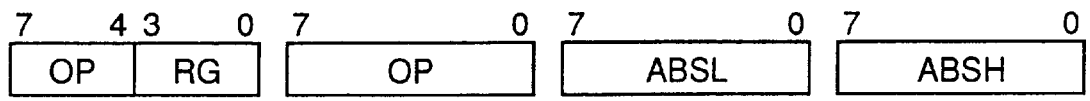
FIG. 2 shows another example of an arrangement of an instruction code using the absolute addressing mode used in a microprocessor in the related art.

In the example of FIG. 1, the instruction code includes the three bytes. However, in this example, because the field of the operation code OP includes only the four bits, merely 16 instructions can be expressed. Accordingly, when more than 16 instructions should be expressed, as shown in FIG. 2, in order to extend the field of the operation code OP, it is necessary to add one byte. In the example of FIG. 2, the field of the operation code OP includes not only the more significant 4 bits of the first byte of the instruction code but also the 8 bits of the second byte. The third byte and fourth byte are the less significant byte and the more significant byte of the absolute address of the second operand.

Figure 3A:
FIGS. 3A and 3B show other examples of an arrangement of an instruction code using the absolute addressing mode used in a microprocessor in the related art.
Figure 3B:
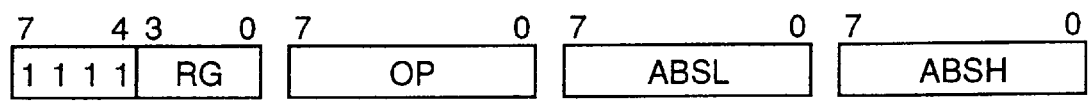

In contrast to this, it is possible that the extension code of the operation code OP is added to the instruction code only when the operation code OP is a specific value. For example, as shown in FIGS. 4A and 3B, when the value of the operation code OP of the more significant 4 bits of the first byte is one of the values from '$(0000)_2=0$' to '$(1110)_2=14$', as shown in FIG. 3A, the instruction code includes the three bytes. However, when the value of the operation code OP of the more significant 4 bits of the first byte is '$(1111)_2=15$', as shown in FIG. 3B, the extension code of the operation code OP is added to the instruction code as the second byte. Thus, the arrangement of the instruction code is similar to that of FIG. 2. Thus, it is possible that the length of the instruction code is of the three bytes for each of the 15 instructions corresponding to the cases except the case where the above-mentioned operation code OP has the specific value '$(1111)_2$'. However, for the instructions other than these 15 instructions, the extension code of the operation code OP is added and the length of each instruction is of the four bytes.

In the above-mentioned case of the absolute addressing mode, the instruction code includes the absolute address of an operand, that is, the address value itself. Accordingly, as a method of reducing the size of a program executed by the microprocessor, it can be considered that the length of an instruction code using the absolute addressing mode is reduced as a result of reducing a bit size expressing an address value. A method therefor will now be described.

An address which indicates a position of a main memory is allocated for each byte. In contrast to this, in a general program, the data size of an operand is an integer times the length of the basic word of the microprocessor which executes the program. Accordingly, in a main memory of the microprocessor which uses two bytes as the length of the basic word, in many cases, data is arranged from addresses of multiples of 2, that is, even-number addresses. When data is arranged from even-number addresses, the least significant bit of the addressing data in the absolute addressing mode is always '0'. When all the data is arranged from even number addresses, this least significant bit is fixed to be '0' and thus is an unnecessary bit. Similarly, when the length of the basic word is 4 bytes and all the data is arranged from the addresses of multiples of 4, the less significant two bit are unnecessary bits. Accordingly, by eliminating these unnecessary bits of addressing data in the absolute addressing mode, it is possible to reduce the size of a program.

Figure 4:
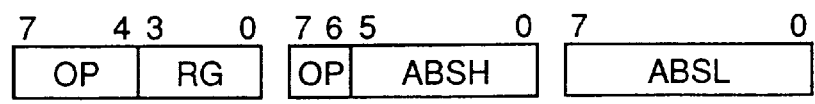
FIG. 4 shows an example of an arrangement of an instruction code using the absolute addressing mode used in a microprocessor in an embodiment of the present invention.

When data to be accessed in the absolute addressing mode is always arranged from multiples of 4, that is, when 4-byte data (hereinafter, which may be referred to as 'long word') is arranged so that the boundaries of the long words are in alignment with the addresses of multiples of 4, it is preferable to use an instruction code such as that shown in FIG. 4, for example. In this case, each of the less significant 2 bits of each absolute address is always '0'. Accordingly, these bits are eliminated from addressing data. These two bits are instead used as a field of an operation code. That is, the 7th bit and 6th bit (the more significant two bits) of the second byte of an instruction code are used as a field of a operation code OP. The less significant 6 bits from the 5th bit to 0th bit of the second byte are used as the more significant byte data ABSH of the absolute address. In the example of FIG. 4, the data ABSH and ABSL indicating the absolute address are arranged in the instruction code so that the right end bit of the data ABSL is located at the right end bit of the instruction code. When obtaining the absolute address (effective address), the data ABSH and ABSL is shifted 2 bits leftwardly inside the microprocessor. In this case, because the operation code OP is of 6 bits, it is possible to express 64 instructions.

Figure 5:
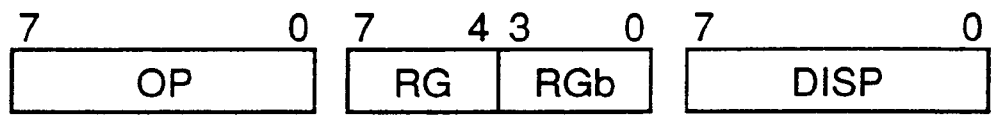
FIG. 5 shows an example of an arrangement of an instruction code using a displacement-adding register indirect addressing mode used in a microprocessor in the related art.

FIG. 5 shows an arrangement of an instruction code using the displacement-adding register indirect addressing mode in the related art. This instruction code includes three bytes and processes two operands (first operand and second operand). The first operand is the data stored in a predetermined register, and the second operand is data which is taken out from the main memory by displacement-adding register indirect addressing. In the three bytes of the instruction code, the 8 bits of the first byte are used as a field of operation code OP. Thereby, it is possible to express 256 instructions. The more significant 4 bits from the 7th bit to 4th bit of the second byte are used as a field indicating a register RG in which the first operand is stored. The less significant 4 bits from the 3rd bit to 0th bit of the second byte are used as a field indicating a base register RGb which is used when the effective address of the second operand is obtained in the displacement-adding register indirect addressing mode. The 8 bits of the third byte are used as a field in which a value of displacement DISP used when obtaining the effective address of the second operand is stored. Expressions of two's complements are used as the displacement DISP. Thereby, as displacements, values in a range from −128 to 127 can be used.

In the displacement-adding register indirect addressing mode, the address of the main memory at which an operand is stored, that is, the effective address is obtained as a result of adding a displacement indicated by an instruction to the value of a register indicated by the instruction. In the example of FIG. 5, the value of the displacement DISP is added to the value stored in the base register RGb, and the thus-obtained value is the effective address of the second operand. The value itself of the displacement used here is a part of the instruction code. Accordingly, by reducing the bit size expressing the value, it is possible to reduce the length of an instruction code using the displacement-adding register indirect addressing mode. Thereby, it is possible to reduce a program size.

As described above, the length of data as an operand is an integer times the length of the basic word of the microprocessor, and also, in many cases, the address of an operand is an integer times the length of the basic word. In the displacement-adding register indirect addressing mode, in many cases, the value of the base register used in calculation of the effective address is an integer times the length of the basic word. Therefore, in many case, the value of the displacement which is added to the value of the base register is an integer times the length of the basic word. For example, when each operand is 4-byte data, in many cases, the value of each displacement is a multiple of 4. When the value of each displacement is a multiple of 4, each of the less significant two bits are fixed to be '0' and thus is an unnecessary bit. Accordingly, by eliminating these unnecessary bits of the addressing data in the displacement-adding register indirect addressing mode, it is possible to reduce a program size.

Figure 6:
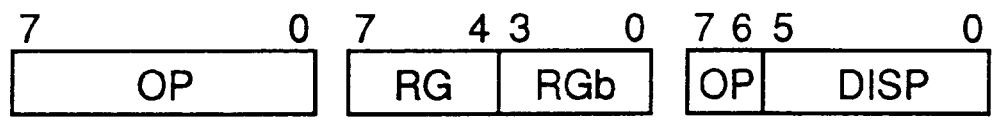
FIG. 6 shows an example of an arrangement of an instruction code using the displacement-adding register indirect addressing mode used in the microprocessor in the embodiment of the present invention.

Therefore, when the value of each displacement is a multiple of 4 in the displacement-adding register indirect addressing mode, it is preferable to use an instruction code such as that shown in FIG. 6, for example. In the example of FIG. 6, the less significant two bits of a displacement are eliminated, the 6 bits from the 5th bit to the 0th bit of the third byte of the instruction code are used as a field of the displacement DISP, and the 7th bit and the 6th bit of the third byte is used as a field of an operation code OP. Thereby, the field of the operation code OP increases two bits with the same length of the instruction code. Accordingly, the instruction code is substantially reduced.

Each displacement used in the displacement-adding register indirect addressing mode is generally data with a sign, and sign bits of the displacement are extended to the bit size of the base register in which the value to which the displacement is to be added is stored. Accordingly, the most significant bit of each displacement is a sign bit. When a displacement is positive, the sign bit thereof is '0' and when a displacement is negative, the sign bit thereof is '1'. In many cases, depending on the type of a program to be executed, only one of a positive value or a negative value is used as a displacement. When each displacement is always positive or when each displacement is always negative, an instruction code such as that shown in FIG. 7, for example, may be used. In this example, the most significant bit of a displacement is eliminated, the 5 bits from the 4th bit to the 0th bit of the third byte of the instruction code are used as a field of the displacement DISP, and the 3 bits from the 7th bit to the 5th bit of the third byte are used as a field of an operation code OP. Thereby, the field of the operation code OP increases three bits with the same length of the instruction code. Accordingly, the instruction code is substantially further reduced.

Figure 7:
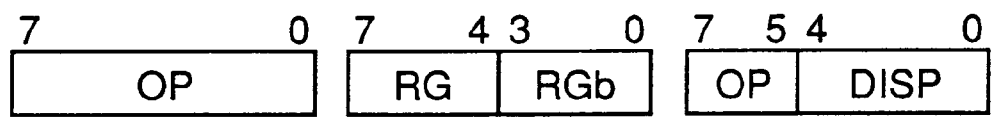
FIG. 7 shows another example of an arrangement of an instruction code using the displacement-adding register indirect addressing mode used in the microprocessor in the embodiment of the present invention.

When the displacement-adding register indirect addressing mode is used, as shown in FIGS. 5, 6 and 7, a field indicating a base register RGb should be provided in each instruction code. For example, when the base register is selected from 8 registers, a 3-bit field is needed. However, in an ordinary program, registers used as the base register are limited. For example, when only two base registers are used, only one bit is needed as a field indicating the base register. When only a specific one register is used as the base register, no field is needed for indicating the base register RGb. Further, the sign (positive or negative) of a displacement is determined by the type of the base register in almost all cases. Accordingly, when the base register has been determined, for example, when only a specific register is used as the base register, in many cases, the sign bit of a displacement is not needed. Therefore, in such a case, in addressing data, by eliminating a field for indicating the base register and the sign bit of a displacement, it is possible to reduce a program size.

Thus, it is possible to reduce an instruction code in the absolute addressing mode and in the displacement-adding register indirect addressing mode. However, for this purpose, it is necessary that data of operands be always arranged from the boundaries of 4-byte data, the value of a displacement be always a multiple of 4, only one of a positive value and negative value be used as a displacement, only a specific register be used as a base register, or the like. These conditions may be fulfilled ordinarily in many cases. However, a microprocessor, which uses an instruction code which is reduced, cannot execute a program when addressing which does not fulfill these conditions is made even once in the program to be executed. For example, a microprocessor, which has an instruction code in which the least significant bit of an absolute address is eliminated in the absolute addressing mode, cannot execute a program which includes an instruction indicating in the absolute addressing mode an operand stored in an odd number address. Therefore, in order to provide for the cases where the above-mentioned conditions are not fulfilled, it is preferable that addressing by an instruction code in which code reduction is not made can be performed. That is, it is preferable that addressing by an instruction code in which elimination of less significant bits of each of an absolute ad dress and a displacement is not made, and elimination of the sign bit of a displacement is not made can also be used. Even though these addressing modes in the related art can be used, in many cases, an addressing mode in which an instruction code can be reduced is used in an actual program. Accordingly, it is possible to reduce the size of the entire program.

Similar to general microprocessors in the related art, the microprocessor in the embodiment of the present invention includes a program counter, a register group which includes a general purpose register, a stack pointer register (hereinafter, referred to as a 'SP register') and a frame pointer register (hereinafter, referred to as a 'FP register'), an address generating portion for calculating effective addresses of operands, and an operation processing portion for executing operations indicated by operation codes of instructions. However, different from microprocessors in the related art, it is possible to use addressing modes based on the above-described basic concept (addressing modes in which each instruction code can be reduced). Specifically, for example, it is possible to use the absolute addressing mode by the instruction code shown in FIG. 4, the displacement-adding register indirect addressing mode by the instruction code shown in FIG. 6 or FIG. 7, and/or a displacement-adding register indirect addressing mode in which a specific register such as a SP register or a FP register is used as a base register (in this mode, an instruction code does not include a field which indicates the base register). The address generating portion in the microprocessor uses addressing data of these instruction codes, performs shift, addition, sign bit addition and so forth, and thus generates effective addresses.

In the above-mentioned microprocessor, each instruction code which uses the respective one of the above-mentioned addressing modes can be reduced. Thereby, it is possible to reduce the size of a program to be executed. In the above-mentioned microprocessor, it is preferable that it be possible to use not only the above-mentioned addressing modes in which each instruction code can be reduced but also addressing modes in which reduction of each instruction code is not performed (addressing mode in the related art). Thereby, it is possible that the microprocessor can execute a program including an instruction code which uses data stored in an odd-number address as an operand, and can execute a program including an instruction code which performs addressing with a positive displacement from a base register and an instruction code which performs addressing with a negative displacement from the same base register.

In order to show a specific method of the above-described embodiment, the embodiment will now be described in detail using the microprocessor as an example which uses the displacement-adding register indirect addressing mode in which an FP register is used as a base register based on the above-mentioned concept.

In the microprocessor in the embodiment, it is possible to use not only addressing modes which can be used in microprocessors in the related art, but also a displacement-adding register indirect addressing mode in which, based on the above-described concept, an FP register is used as a base register and a negative even number is used as a displacement.

Figure 8:
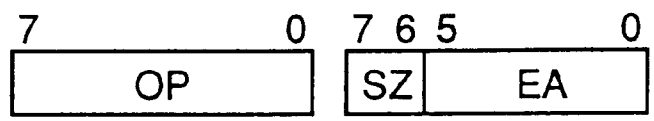
FIG. 8 shows an arrangement of a basic portion of an instruction code used in the microprocessor in the embodiment of the present invention.

First, an addressing mode similar to that of microprocessors in the related art (hereinafter, referred to as a 'related-art mode') will now be described. FIG. 8 shows an arrangement of a basic portion of an instruction code of the microprocessor in the embodiment when a related-art mode is used. In this arrangement, the 8 bits of the first byte of the instruction code are used as a field of an operation code OP. The two bits including the 7th bit and 6th bit of the second byte are used as a field which indicates the size of an operand, that is, the size of data which can be processed by the instruction (hereinafter, referred to as 'operation size' and indicated by a symbol 'SZ'). The 6 bits, from 5th bit through 0th bit of the second byte are used as a field which stores data (hereinafter, referred to as 'addressing mode data', and indicated by a symbol 'EA') for indicating the addressing mode which is used in the instruction. The value '$(00)_2$' of the operation size SZ indicates a byte, '$(01)_2$' indicates a word (two bytes) and '$(10)_2$' indicates a long word (four bytes).

FIGS. 9A, 9B, 9C and 9D show related-art modes of the addressing modes which can be used in the microprocessor in the embodiment. FIG. 9A shows register indirect addressing modes and register addressing modes. FIG. 9B shows absolute addressing modes. FIG. 9C shows register indirect addressing modes using specific registers. FIG. 9D shows other addressing modes. Which one of these various addressing modes is to be used is determined by the value of the above-mentioned addressing mode data EA.

For example, when the value of the addressing mode data EA corresponding to the symbol [D, $] (see FIG. 9A) is included in an instruction code, a register indirect addressing mode with an 8-bit displacement is used. In this case, a 1-byte field which stores the value of the displacement is added to the basic portion of the instruction code, shown in FIG. 8. As a result, the instruction code includes the three bytes.

Figure 10:
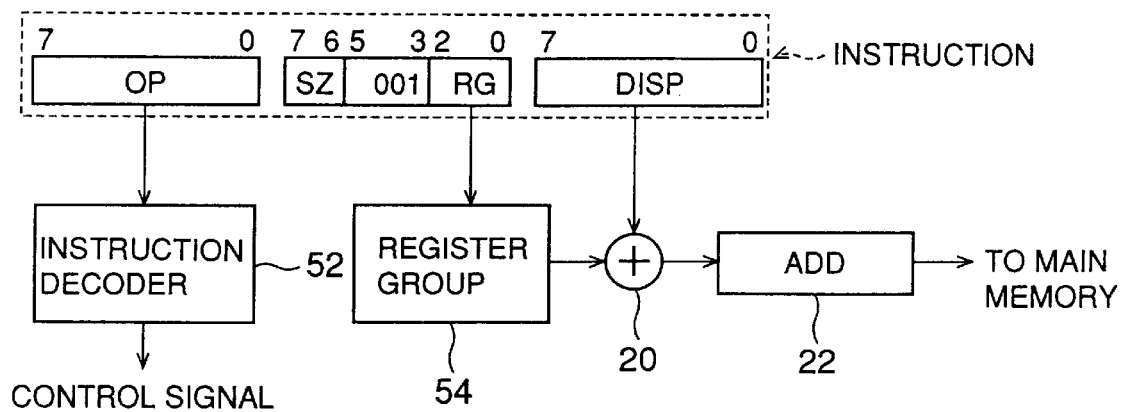
FIG. 10 conceptually shows operations of the microprocessor in the embodiment when the displacement-adding register indirect addressing mode in the related art is used.

FIG. 10 conceptually shows operations of the microprocessor when the above-mentioned 8-bit-displacement-adding register indirect addressing mode [D, $] is used. In this case, the operation code OP stored in the first byte of an instruction code is, similar to cases of other addressing modes, decoded by an instruction decoder 52. Thus, a control signal, which controls operations of the operation processing portion (not shown in the figure) and so forth provided in the microprocessor, is generated. The data of the less significant three bits (from the 2nd bit through the 0th bit) of the addressing mode data EA in the second byte of the instruction code is used for indicating a base register from the register group 54. The value stored in the indicated base register is added to the displacement DISP stored in the third byte of the instruction code, and the thus-obtained value is stored in an effective address buffer 22 as the effective address. Then, the data of the operand stored in the position indicated by this effective address is taken out from the main memory.

In the embodiment, programs executed by the microprocessor are considered to be produced using a high-level language such as 'C', 'FORTRAN' or the like. Therefore, data corresponding to variables (such as auto-variables in the 'C' language or the like) which are used only inside functions in the 'C' language or sub-routines of the 'FORTRAN' is frequently accessed. As a result, in programs executed by the microprocessor in the embodiment, the displacement-adding register indirect addressing in which an FP register is used as the base register and a negative even number is used as the displacement is frequently used. Accordingly, in the embodiment, in order to reduce an instruction code based on the above-described concept using this characteristic, a special addressing mode using an FP register as the base register (hereinafter, referred to as 'reducing FP indirect addressing mode') is prepared.

Figure 11:
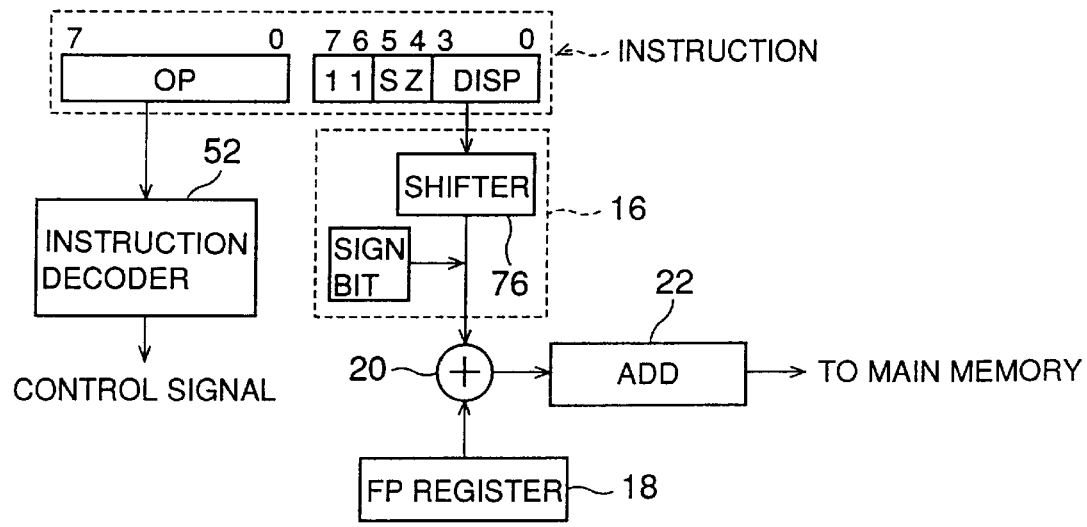
FIG. 11 conceptually shows operations of the microprocessor in the embodiment when the displacement-adding FP register indirect addressing mode (reducing FP indirect addressing mode) according to the present invention is used.
Figure 12:
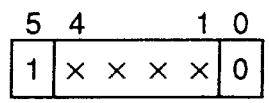
FIG. 12 illustrates reduction of a displacement in the reducing FP indirect addressing mode.

FIG. 11 conceptually shows operations of the microprocessor when this reducing FP indirect addressing mode is used. In this case, similar to cases of other addressing modes, the first byte of the instruction code is the operation code OP, which is decoded by the instruction decoder 52. Thus, a control signal, which controls operations of the operation processing portion (not shown in the figure) and so forth provided in the microprocessor, is generated. In the more significant two bits of the second byte of the instruction code, the value '$(11)_2$', which is not used as the value of the operation size SZ, is set as shown in the figure. Thereby, the microprocessor recognizes that this instruction uses the reducing FP indirect addressing mode. Based on this recognition, the address generating portion generates the effective address in the method for the reducing FP indirect addressing mode (details will be described later). In this case, as shown in FIG. 11, the two bits including the 5th bit and 4th bit of the second byte are used as a field of the operation size SZ. In the remaining 4 bits (from 3rd bit through 0th bit) of the second byte, data indicating displacement DISP is set. At this time, the displacement is a negative even number expressed by 6 bits, and, as shown in FIG. 12, the most significant bit is fixed to be '1' and the least significant bit is fixed to be '0'. An integer without sign expressed by 4 bits other than the most significant bit and the least significant bit is set in the 4 bits from the 3rd bit through 0th bit of the second byte. Thus, in the reducing FP indirect addressing mode, the displacement is one of even numbers from −2 through −32, and an instruction code is formed of two bytes. In this case, the effective address is calculated by the address generating portion as follows.

First, a shifter 76 shifts one bit leftwardly the integer without sign which is the data of the displacement set in the less significant 4 bits of the second byte of an instruction code, '0' is added thereto as the least significant bit, and thus the 5-bit even number without sign is generated. Then, the sign bit '1' is added thereto as the most significant bit, and thus the 6-bit negative even number is generated. Then, the value stored in the FP register is added to this negative even number by an adder 20. The thus-obtained value is stored in the effective address buffer 22 as the effective address. Then, the data of the operand stored in the position indicated by this effective address is taken out from the main memory.

In the above-described reducing FP indirect addressing mode, as the displacement, only the even numbers in the range from −2 through −32 can be used. However, for other cases, the microprocessor in the embodiment can use displacement-adding FP register indirect addressing modes in the related art. That is, the addressing mode indicated by the symbol [FP, $] in FIG. 9C can be used. Thereby, the displacement DISP is formed of 8 bits similar to the case of FIG. 10. Accordingly, in the addressing using an FP register as the base register, the displacements in the range from −128 through 127 can be used. When this addressing mode is used, the length of the instruction code is three bytes. However, this addressing mode is not used frequently, while the reducing FP indirect addressing mode in which the length of the instruction code is two bytes is frequently used. Accordingly, the size of the entire program is reduced.

Figure 13:
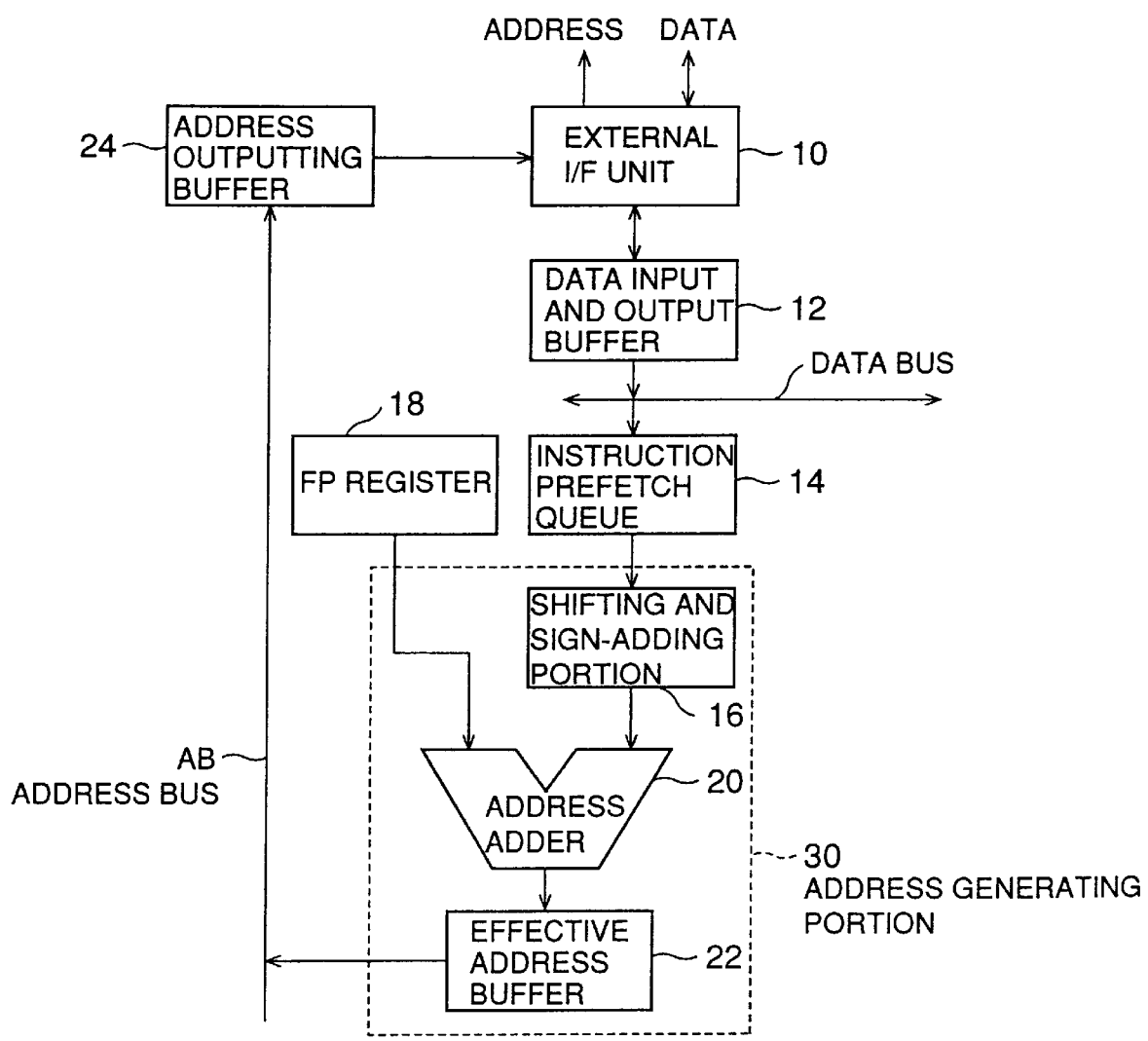
FIG. 13 shows a block diagram of a part of the arrangement of the microprocessor in the embodiment of the present invention.

FIG. 13 shows a block diagram of a part of the microprocessor in the embodiment, in which part the effective address of the operand of an instruction using the reducing FP indirect addressing mode is generated, the effective address is used and thereby the operand is taken out from the main memory (not shown in the figure).

The microprocessor in the embodiment includes an external interface unit 10, a data input and output buffer 12 and an address outputting buffer 24 for transmitting data to and receiving data from the outside. By outputting to the outside via the external interface unit 10 an address value held in the address outputting buffer 24, data held in the data input and output buffer 12 is stored in the main memory, and data and/or instructions stored in the main memory is taken out and then is held in the data input and output buffer 12. Further, the microprocessor in the embodiment includes an instruction prefetch queue 14. Instructions are previously read and stored in the instruction prefetch queue 14. When the instructions stored in the instruction prefetch queue 14 are taken out therefrom in sequence, the addresses of the operands of the instruction are generated by an address generating portion 30.

The address generating portion 30 of the microprocessor in the embodiment includes the address adder 20, the effective address buffer 22 and a shifting and sign-adding portion 16. By performing address calculation for an addressing mode which is indicated by addressing mode data EA, the address generating portion 30 generates the effective address. When an instruction to be executed uses the above-mentioned reducing FP indirect addressing mode, the shifting and sign-adding portion 16 shifts the 4-bit data DISP which indicates the displacement included in the instruction code (see FIG. 11). Further, by adding the sign bit '1' to the data as the most significant bit, the address generating portion 30 generates the value of the displacement which is the negative even number. Then, the address adder 20 adds this value of the displacement to the value stored in the FP register 18, and the address generating portion 30 stores the thus-obtained value in the effective address buffer 22 as the effective address. Then, the address generating portion 30 transfers this effective address to the address outputting buffer 24 via an address bus AB which is provided inside the microprocessor. Then, as a result of the effective address held in the address outputting buffer 24 being output via the external interface unit 10, the data of the operand stored in the main memory is read and is input to the microprocessor.

The data of the operand which is thus input to the microprocessor from the main memory is temporarily stored in the data input and output buffer 12. Then, based on the operation code of the instruction, the data of the operand is transferred to the operation processing portion (not shown in the figure), and the predetermined process is performed.

In the above-described microprocessor, thus, instructions using the reducing FP indirect addressing mode are executed. When an instruction code using an absolute addressing mode is reduced based on the above-described concept, as a result of the address value included in the instruction code being shifted a predetermined number of bits leftwardly by the shifting and sign-adding portion 16, the effective address can be generated. Further, as it is easily seen, when an instruction code having a field for indicating a base register and using a displacement-adding register indirect addressing mode is reduced based on the above-described concept, the above-described microprocessor can appropriately process the instruction code. In this case, the address adder 20 adds the value stored in the base register which is indicated by the instruction code to the value of the displacement output from the shifting and sign-adding portion 16. The thus-obtained value is the effective address.

Further, the present invention is not limited to the above-described embodiments, and variations and modifications may be made without departing from the scope of the present invention claimed in the following claims.

What is claimed is:

1. A data processing apparatus which executes a program including an instruction which indicates an address for taking out an operand from a main memory in a predetermined addressing mode, said apparatus comprising:

address generating means for shifting leftwardly by a predetermined number of bits a value of a displacement which is indicated by the instruction and outputting a predetermined number of displacement bits; and adding means for adding all of the predetermined number of displacement bits output by said address generating means to a base value stored in a predetermined register other than a program counter and thus generating an effective address, when the operand of said instruction is taken out from said main memory, wherein the operand of said instruction taken out from said main memory includes data and not an instruction code.

2. The data processing apparatus according to claim 1, wherein said address generating means treats the value of the displacement as a positive integer without sign and performs the shifting and the adding.

3. The data processing apparatus according to claim 1, wherein said address generating means treats the value of the displacement as a negative integer without sign and performs the shifting and the adding.

4. The data processing apparatus according to claim 1, wherein said address generating means adds the shifted value of the displacement to the value stored in a register which is previously fixed for the addressing mode of the instruction and thus generates the effective address.

5. The data processing apparatus according to claim 3, further comprising an FP register which stores the value of a frame pointer, wherein said address generating means treats the value of the displacement indicated by the instruction as an integer without sign, shifts said value one bit leftwardly, causes the resulting value to be a negative integer by adding '1' as the sign bit to said value as the most significant bit, adds said negative integer to the value stored in said FP register and thus generates the effective address.

6. The data processing apparatus according to claim 4, wherein:

said instruction includes a 2-bit field for indicating any of three sizes as the size of the operand of said instruction; and said address generating means adds the shifted value of the displacement to the value stored in said register which is previously fixed for said addressing mode of said instruction and thus generates the effective address, when a value of the four values which can be expressed by the 2 bits, said value not being used for indicating the size of the operand, is set in said 2-bit field.

7. A data processing apparatus which executes a program including an instruction which indicates an address for taking out an operand from a main memory in a predetermined addressing mode, said apparatus comprising:

address generating means for shifting leftwardly by a predetermined number of bits a displacement value of an address which is indicated by the instruction; and adding means for adding the thus-shifted displacement value to a base value stored in a predetermined register other than a program counter to generate an effective address, when the operand of said instruction is taken out from said main memory, wherein the operand of said instruction taken out from said main memory includes data and not an instruction code.

8. A microprocessor which executes a program including an instruction which indicates an address for taking out an operand from a main memory in a predetermined addressing mode, said microprocessor comprising:

a shifting unit which shifts leftwardly by a predetermined number of bits a value of a displacement which is indicated by the instruction and outputs a predetermined number of displacement bits; and an adder that adds all of the predetermined number of displacement bits output by said shifting unit to a base value stored in a predetermined register other than a program counter and thus generates an effective address, when the operand of said instruction is taken out from said main memory, wherein the operand of said instruction taken out from said main memory includes data and not an instruction code.

9. The microprocessor according to claim 8, wherein said address generating portion treats the value of the displacement as a positive integer without sign and performs the shifting and the adding.

10. The microprocessor according to claim 8, wherein said address generating portion treats the value of the displacement as a negative integer without sign and performs the shifting and the adding.

11. The microprocessor according to claim 8, wherein said address generating portion adds the shifted value of the displacement to the value stored in a register which is previously fixed for the addressing mode of the instruction and thus generates the effective address.

12. The microprocessor according to claim 10, further comprising an FP register which stores the value of a frame pointer, wherein said address generating portion treats the value of the displacement indicated by the instruction as an integer without sign, shifts said value one bit leftwardly, causes the resulting value to be a negative integer by adding '1' as the sign bit to said value as the most significant bit, adds said negative integer to the value stored in said FP register and thus generates the effective address.

13. The microprocessor according to claim 11, wherein:

said instruction includes a 2-bit field for indicating any of three sizes as the size of the operand of said instruction; and said address generating portion adds the shifted value of the displacement to the value stored in said register which is previously fixed for said addressing mode of said instruction and thus generates the effective address, when a value of the four values which can be expressed by the 2 bits, said value being not used for indicating the size of the operand, is set in said 2-bit field.

14. A microprocessor which executes a program including an instruction which indicates an address for taking out an operand from a main memory in a predetermined addressing mode, said microprocessor comprising:

an address generating portion which shifts leftwardly by a predetermined number of bits a displacement value of an address which is indicated by the instruction; and adding circuitry for adding the thus-shifted displacement value to a base value stored in a predetermined register other than a program counter to generate an effective address, when the operand of said instruction is taken out from said main memory, wherein the operand of said instruction taken out from said main memory includes data and not an instruction code.

15. A data processing method which executes a program including an instruction which indicates an address for taking out an operand from a main memory in a predetermined addressing mode, said method comprising steps of:

shifting leftwardly by a predetermined number of bits a value of a displacement which is indicated by the instruction and outputting a predetermined number of displacement bits; and adding all of the predetermined number of displacement bits output by the shifting step to a base value stored in a predetermined register other than a program counter and thus generating an effective address, when the operand of the instruction is taken out from the main memory, wherein the operand of said instruction taken out from said main memory includes data and not an instruction code.

16. A data processing method which executes a program including an instruction which indicates an address for taking out an operand from a main memory in a predetermined addressing mode, said method comprising steps of:

shifting leftwardly by a predetermined number of bits a displacement value of an address which is indicated by the instruction; and adding the thus-shifted displacement value to a base value stored in a predetermined register other than a program counter to generate an effective address, when the operand of the instruction is taken out from the main memory, wherein the operand of said instruction taken out from said main memory includes data and not an instruction code.

* * * * *